US012327706B2

(12) United States Patent
Zeng et al.

(10) Patent No.: US 12,327,706 B2
(45) Date of Patent: Jun. 10, 2025

(54) INDICATING DEVICE FOR A DUAL-POWER AUTOMATIC TRANSFER SWITCH

(71) Applicant: Schneider Electric Industries SAS, Rueil-Malmaison (FR)

(72) Inventors: Xiaojing Zeng, Shanghai (CN); Junjie Zhou, Shanghai (CN); Bin Znou, Shanghai (CN); Lu Chen, Shanghai (CN); Haoyu Xie, Shanghai (CN); Zhongrui Shen, Shanghai (CN)

(73) Assignee: Schneider Electric Industries SAS, Rueil-Malmaison (FR)

(*) Notice: Subject to any disclaimer, the term of this patent is extended or adjusted under 35 U.S.C. 154(b) by 65 days.

(21) Appl. No.: 17/743,938

(22) Filed: May 13, 2022

(65) Prior Publication Data

US 2022/0367129 A1 Nov. 17, 2022

(30) Foreign Application Priority Data

May 14, 2021 (CN) ......................... 202121039886.2

(51) Int. Cl.
*H01H 9/16* (2006.01)
*H01H 1/14* (2006.01)
*H01H 9/02* (2006.01)

(52) U.S. Cl.
CPC ................ *H01H 9/16* (2013.01); *H01H 1/14* (2013.01); *H01H 9/02* (2013.01)

(58) Field of Classification Search
CPC .. H01H 9/16; H01H 1/14; H01H 9/02; H01H 9/165; H01H 71/04; H01H 47/00; H01H 50/08; H01H 45/02; G01R 31/327; G08B 5/36
USPC .................................. 200/308, 289; 335/202
See application file for complete search history.

(56) References Cited

FOREIGN PATENT DOCUMENTS

| | | | | |
|---|---|---|---|---|
| CN | 208142055 | U | * | 11/2018 |
| CN | 210110562 | U | | 2/2020 |
| CN | 210640133 | U | | 5/2020 |
| CN | 211063407 | U | | 7/2020 |

(Continued)

OTHER PUBLICATIONS

Translation of CN-208142055-U (Year: 2018).*
Indian Office Action dated Nov. 25, 2022 for corresponding Indian Application No. 202244027753, 6 pages.

*Primary Examiner* — Edwin A. Leon
(74) *Attorney, Agent, or Firm* — Troutman Pepper Locke LLP

(57) ABSTRACT

An indicating device for a dual power automatic transfer switch, which includes a first driving part connected to a first moving contact of a first power supply and a second driving part connected to a second moving contact of a second power supply; the indicating device includes a mechanical indicating device, an electrical indicating device and an indicating part acting on the mechanical indicating device and the electrical indicating device; the first and the second driving part respectively drive the indicating part to move; the electric indicating device at least includes a first and second switching device; the first switching device at least includes a first contact of the first switching device and a second contact of the first switching device which are connected in parallel; the second switching device at least includes a first contact and a second contact of the second switching device which are connected in parallel.

13 Claims, 8 Drawing Sheets

(56) References Cited

FOREIGN PATENT DOCUMENTS

| | | | | |
|---|---|---|---|---|
| CN | 212304859 U | | 1/2021 | |
| EP | 3799088 | * | 12/2022 | ............... H01H 9/16 |

* cited by examiner

INDICATING DEVICE FOR A DUAL-POWER AUTOMATIC TRANSFER SWITCH

TECHNICAL FIELD

The present disclosure relates to an indicating device for a dual power automatic transfer switch.

TECHNICAL BACKGROUND

An indicating device of a dual power automatic transfer switch (ATSE) is a function module related to safety, which indicates to a user the current switching on or switching off of ATSE contacts, such as switching on a first power supply (S1 on) or switching on a second power supply (S2 on) or switching off position which is not connected with the first power supply and the second power supply. When ATSE has isolation function, the user can padlock in the OFF position to ensure the isolation of the power supply from the load side, and let the maintenance staff safely maintain the load side equipment.

However, in some products of the prior art, the contact is not rigidly connected with a mechanism drive, which leads to incorrect indication when the indicator is connected with the mechanism drive instead of the contact. For example, when the moving contact cannot be separated by the mechanism drive due to welding or jamming, but the mechanism drive has reached the OFF position. This is dangerous! The indicating device of the dual power automatic transfer switch (ATSE) can provide mechanical indication of the position and state of the contact, and can also provide electrical indication of the position and state of the contact through micro switch, so its correct design is also very critical.

In the prior art, the stroke of the micro switch is usually short, which requires very high position accuracy of the indicating pressure bar of the micro switch, and easily leads to electrical indication failure. The indication signal provided by the single-layer microswitch has the probability of occasional signal fluctuation or signal loss caused by vibration impact or foreign matter. Because of the limited contact area with the micro-switch, similar to line contact, the indicating part has a large swing and torsion space, and there is a possibility that it can't be matched with the micro-switch according to the theoretical position due to inertia, thus feeding back wrong signals, resulting in product failure.

In addition, in the prior art, there is a risk that the indicating rod driving compress bar to break, so the strength of the part is required to be high.

In the prior art, there is a solution to increase the opening/closing position retaining spring and remove the driving press rod of the indicating rod, so as to ensure more reliable indication and strength of parts. However, the disadvantage of this scheme is that there is only a single micro-motion indicating position (single contact) for S1 switching on position and S2 switching on position, which depends on the reliability of micro-motion itself and often fails in the life of the dual power automatic transfer switch.

SUMMARY

In order to solve the defects and deficiencies in the prior art, 1 according to one aspect of the present disclosure, an indicating device for a dual-power automatic transfer switch is provided, the dual-power automatic transfer switch comprises a first driving part connected to a first moving contact of a first power supply and a second driving part connected to a second moving contact of a second power supply.

The indicating device comprises a mechanical indicating device, an electrical indicating device and an indicating part acting on the mechanical indicating device and the electrical indicating device.

The first driving part and the second driving part respectively drive the indicating part to move.

The electric indicating device at least comprises a first switching device and a second switching device.

The first switching device at least comprises a first contact of the first switching device and a second contact of the first switching device which are connected in parallel.

The second switching device at least comprises a first contact of the second switching device and a second contact of the second switching device which are connected in parallel.

According to the above aspect of the present disclosure, a lead pin of the first contact of the first switching device and a lead pin of the second contact of the first switching device are connected in parallel outside the first switching device.

A lead pin of the first contact of the second switching device and a lead pin of the second contact of the second switching device are connected in parallel outside the second switching device.

According to the above aspects of the present disclosure, the lead pin of the first contact of the first switching device and the lead pin of the second contact of the first switching device are connected in parallel inside the first switching device.

The first contact of the first switching device and the second contact of the first switching device have a common lead pin outside the first switching device.

The lead pin of the first contact of the second switching device and the lead pin of the second contact of the second switching device are connected in parallel inside the second switching device.

The first contact of the second switching device and the second contact of the second switching device have a common lead pin outside the second switching device.

According to the above aspects of the present disclosure, the first switching device and the second switching device are respectively arranged on both sides of the indicating part.

According to the above aspects of the present disclosure, the first switching device and the second switching device are arranged on the same side of the indicating part.

According to the above aspects of the present disclosure, the movement of the indicating part drives the mechanical indicating device to move to a position indicating the first power supply to switch on, a position indicating the second power supply to switch on and a position indicating that the first power supply and the second power supply are all switched off.

The movement of the indicating part correspondingly actuates the electrical indicating device to indicate a switching-on signal of the first power supply, a switching-on signal of the second power supply and a switching-off signal of the first power supply and the second power supply.

According to the above aspects of the present disclosure, the indicating part is an indicating rod.

A first end of the indicating rod is provided with an indicating rod groove;

A mechanical swing rod arranged on the mechanical indicating device can slide in the indicating rod groove.

With the movement of the indicating rod, the indicating rod groove actuates the mechanical swing rod, so that the mechanical indicating device rotates around a rotation center arranged on the housing of the dual-power automatic transfer switch to the position indicating the first power supply is switched on, the second power supply is switched on and the first power supply and the second power supply are all switched off.

According to the above aspects of the present disclosure, the second end of the indicating rod is provided with an indicating rod pressing plate.

The indicating rod pressing plate comprises a pressing plate slot.

When the indicating rod pressing plate simultaneously presses the first contact of the first switching device and the second contact of the first switching device and the first contact of the second switching device and the second contact of the second switching device, the first switching device and the second switching device both provide switching off signals.

When the indicating rod pressing plate simultaneously presses the first contact of the first switching device and the second contact of the first switching device, and the first contact of the second switching device and the second contact of the second switching device are in the pressing plate slot, the first switching device provides the switching off signal of the first power supply, and the second switching device provides the switching on signal of the second power supply.

When the indicating rod pressing plate presses the first contact of the second switching device and the second contact of the second switching device, and the first contact of the first switching device and the second contact of the first switching device are in the pressing plate slot, the second switching device provides the switching off signal of the second power supply, and the first switching device provides the switching on signal of the first power supply.

According to the above aspects of the present disclosure, an indicating rod fitting part is arranged between the first end and the second end of the indicating rod.

The indicating rod fitting part comprises an indicating rod first engaging part and an indicating rod second engaging part.

The indicating rod first engaging part is matched with the first driving part, and the movement of the first driving part actuates the first engaging part to drive the indicating rod to move.

The indicating rod second engaging part is matched with the second driving part, and the movement of the second driving part actuates the second engaging part to drive the indicating rod to move.

According to the above aspects of the present disclosure, the indicating rod first engaging part is a first protrusion which is match with a first groove arranged on the first driving part, and the movement of the first groove actuates the first protrusion to drive the indicating rod to move.

The indicating rod second engaging part is a second protrusion which is match with a second groove arranged on the second driving part, and the movement of the second groove actuates the second protrusion to drive the indicating rod to move.

According to the above aspects of the present disclosure, the indicating device also comprises a reset spring.

One end of the reset spring is installed on the housing of the dual-power automatic transfer switch.

The other end of the reset spring acts on the indicating rod, and the reset spring exerts its elastic force on the indicating rod in the direction of switching on the first power supply.

According to the above aspects of the present disclosure, the indicating rod fitting part is a U-shape groove; the first driving part and the second driving part are respectively matched with the first protrusion and the second protrusion in the U-shaped groove.

According to the above aspects of the present disclosure, the first switching device and the second switching device are micro switch.

According to the present disclosure, an electrical indicating device with a micro switch with double contacts is provided. Compared with the prior art, it can achieve more reliable electrical indication, especially in the case of large impact, greatly reducing the occurrence probability of position indication error caused by single contact failure.

According to the present disclosure, the micro switch is directly triggered with the indicating part, so that the number of parts is reduced and the loss of force is reduced.

The contact surface between the indicating part and the micro switch is increased, the swing freedom of the indicating part is reduced, and the movement is more stable.

By using the rigidity difference of the double-layer micro switch on the bracket, the cooperation between the micro switch and the indicating part is more elastic, which can provide a more stable trigger area for the product and a certain buffer for the micro switch.

The reliability of the system is improved by feeding back the position of the double-layer micro switch and connecting the signals in parallel, so that the signal feedback error will not be caused by the pollution or vibration of the micro switch or the unsuccessful lapping of the micro switch.

So far, in order that the detailed description of this disclosure can be better understood, and the contribution of this disclosure to the prior art can be better recognized, this disclosure has outlined the contents of this disclosure quite extensively. Of course, the embodiments of the present disclosure will be described below and will form the subject of the appended claims. Likewise, those skilled in the art will realize that the concept on which this disclosure is based can be easily used as a basis for designing other structures, methods and systems for implementing several purposes of this disclosure. Therefore, it is important that the appended claims should be considered to include such equivalent structures as long as they do not exceed the spirit and scope of this disclosure.

BRIEF DESCRIPTION OF THE DRAWINGS

Through the following drawings, those skilled in the art will have a better understanding of this disclosure, and the advantages of this disclosure can be more clearly reflected. The drawings described here are only for illustrative purposes of selected embodiments, not all possible embodiments, and are intended not to limit the scope of this disclosure.

DETAILED DESCRIPTION

Detailed embodiments according to the present disclosure are described with reference to the following drawings.

Figure 1:
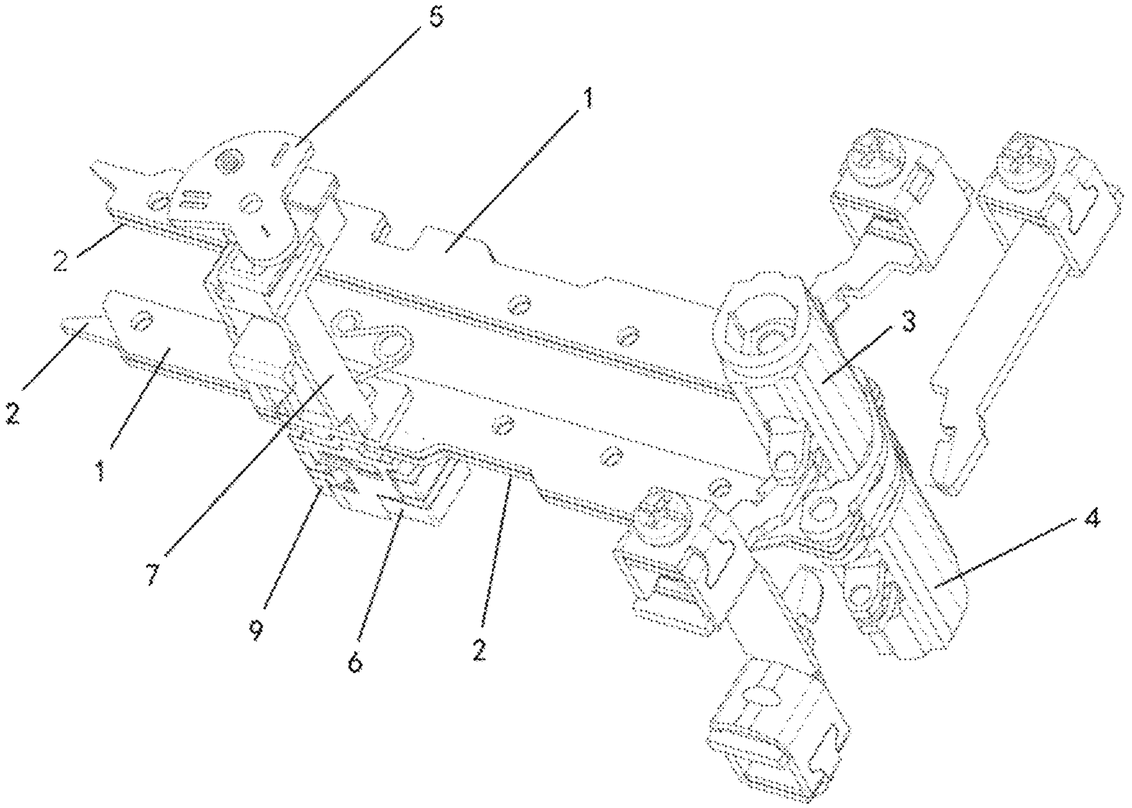
FIG. 1 shows a perspective view of an indicating device suitable for a dual power automatic transfer switch according to the present disclosure.

FIG. 1 shows a perspective view of an indicating device suitable for a dual power automatic transfer switch according to the present disclosure. The dual power automatic transfer switch comprises a first driving part 1 connected to a first moving contact 3 of a first power supply (not shown) and a second driving part 2 connected to a second moving contact 4 of a second power supply (not shown).

The indicating device comprises a mechanical indicating device 5 and an electrical indicating device 6, and an indicating part 7 acting on the mechanical indicating device 5 and the electrical indicating device 6.

The first driving part 1 and the second driving part 2 respectively drive the indicating part 7 to move.

Figure 2:
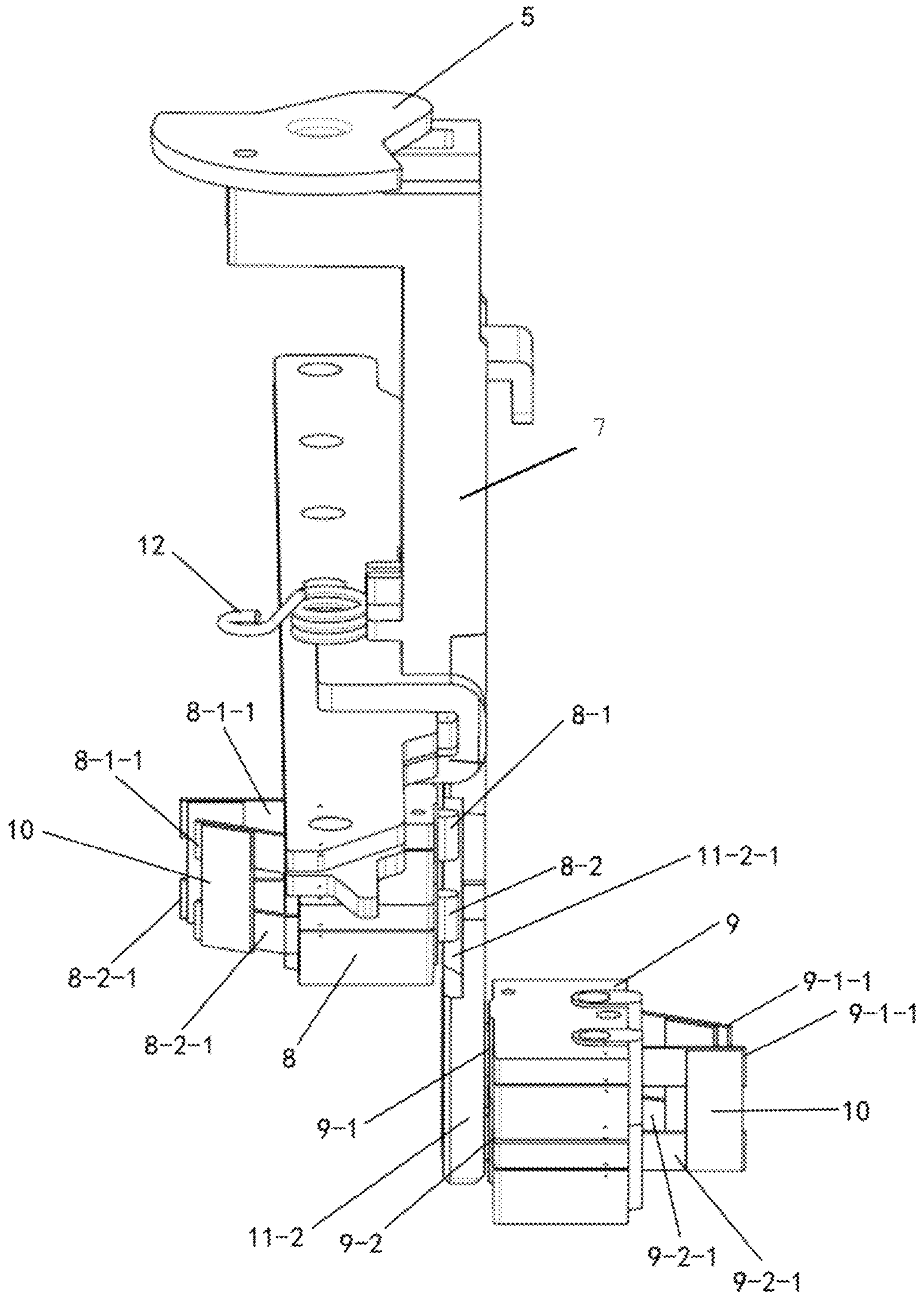
FIG. 2 shows a schematic diagram of a first switching device and a second switching device according to the present disclosure, which are placed on both sides of an indicating part respectively, and their double contacts are connected in parallel outside the switch.

As shown in FIG. 2, the electrical indicating device 6 at least comprises a first switching device 8 and a second switching device 9.

The first switching device 8 at least comprises a first contact 8-1 of the first switching device 8 and a second contact 8-2 of the first switching device 8 which are connected in parallel. The first contact 8-1 of the first switching device and the second contact 8-2 of the first switching device are arranged in a form of up and down layout.

The second switching device 9 at least comprises a first contact 9-1 of the second switching device 9 and a second contact 9-2 of the second switching device 9 connected in parallel. The first contact 9-1 of the second switching device and the second contact 9-2 of the second switching device are arranged in a form of up and down layout.

According to the above embodiment of the present disclosure, as shown in FIG. 2, a lead pin 8-1-1 of the first contact 8-1 of the first switching device 8 and a lead pin 8-2-1 of the second contact 8-2 of the first switching device 8 are connected in parallel outside the first switching device 8, for example, through a conductive member 10.

A lead pin 9-1-1 of the first contact 9-1 of the second switching device 9 and a lead pin 9-2-1 of the second contact 9-2 of the second switching device 9 are connected in parallel outside the second switching device 9, for example, through a conductive member 10.

According to the above embodiments of the present disclosure, as shown in FIG. 2, the lead pin 8-1-1 of the first contact 8-1 of the first switching device 8 and the lead pin 8-2-1 of the second contact 8-2 of the first switching device 8 are connected in parallel inside the first switching device 8.

The first contact 8-1 of the first switching device 8 and the second contact 8-2 of the first switching device 8 have a common lead pin 8-3 outside the first switching device 8.

Figure 6:
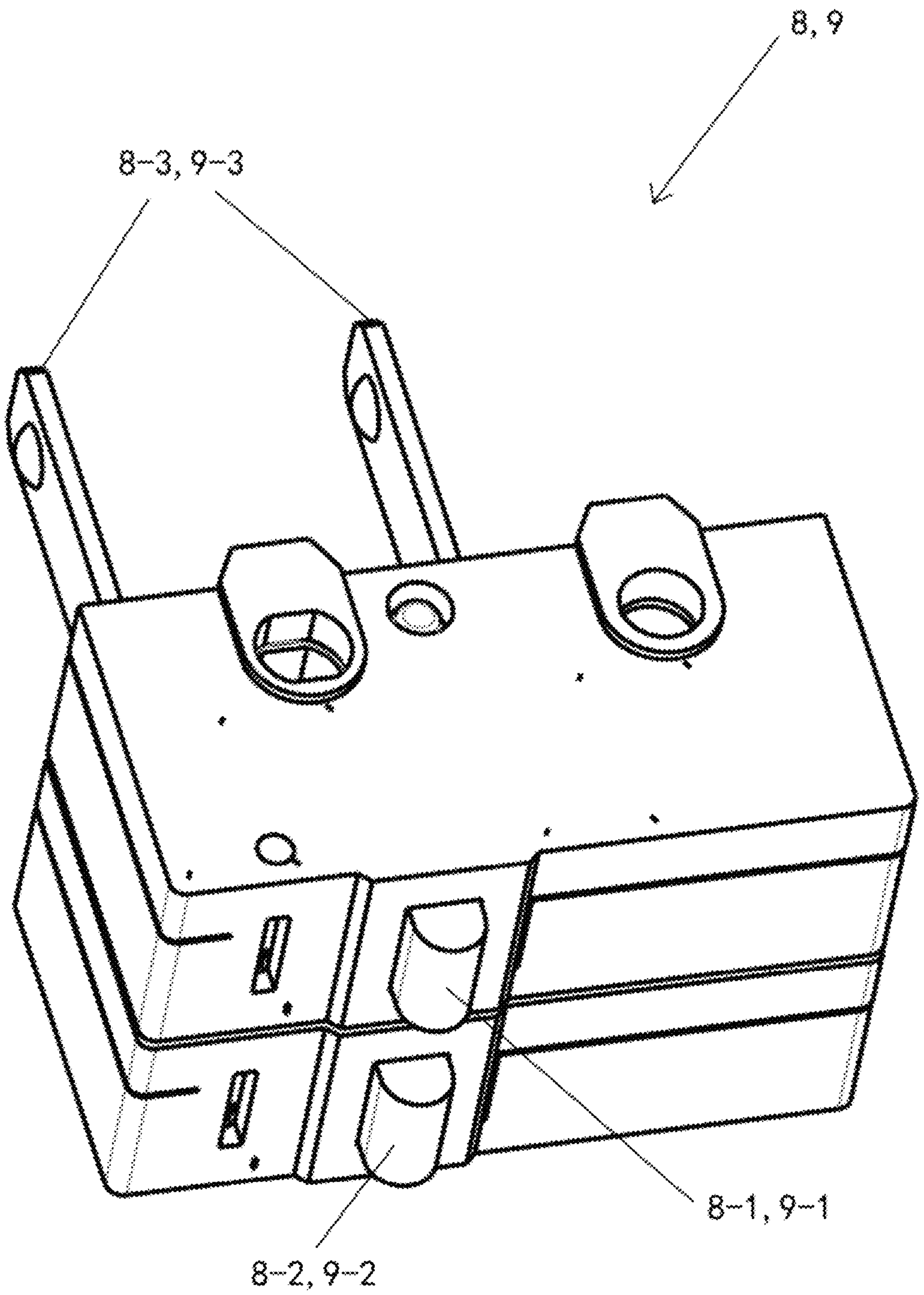
FIG. 6 shows a perspective view of the double contacts of the first switching device and the second switching device in parallel inside the switch according to the present disclosure.
Figure 7:
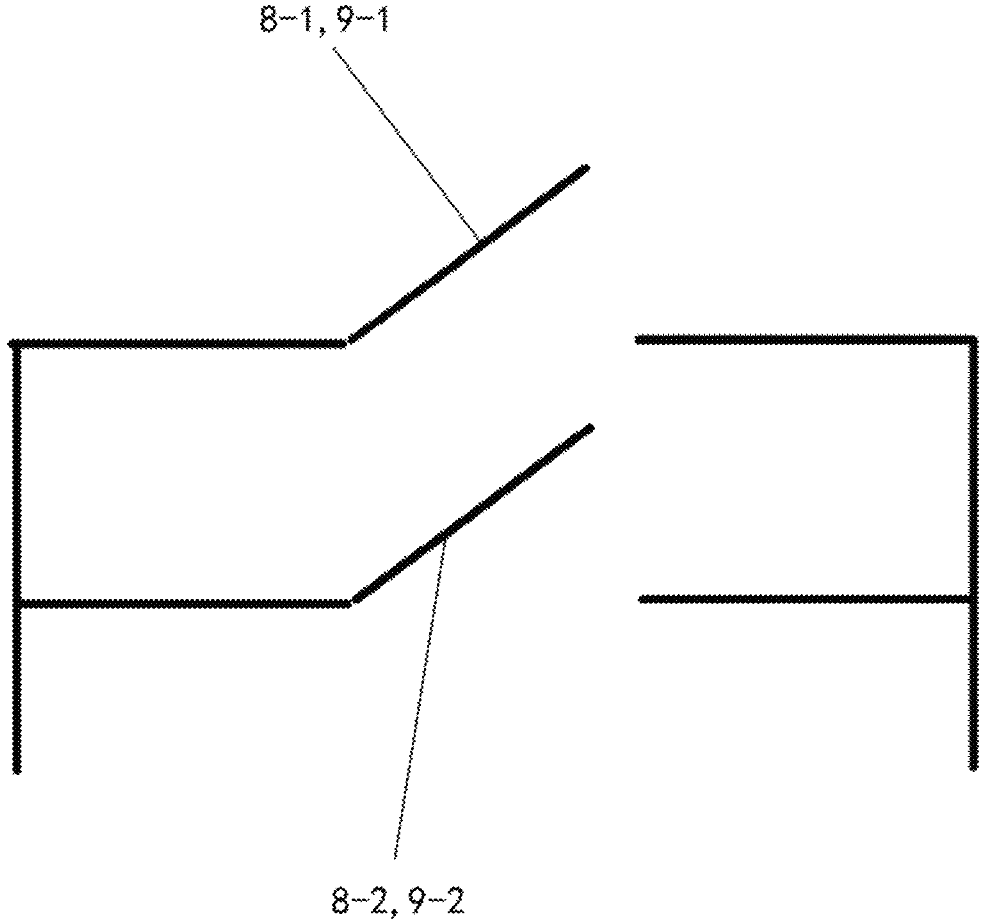
FIG. 7 shows a simplified circuit diagram of FIG. 6.

As shown in FIGS. 6 and 7, the lead pin 9-1-1 of the first contact 9-1 of the second switching device 9 and the lead pin 9-2-1 of the second contact 9-2 of the second switching device 9 are connected in parallel inside the second switching device 9.

The first contact 9-1 of the second switching device 9 and the second contact 9-2 of the second switching device 9 have a common lead pin 9-3 outside the second switching device 9.

Figure 3:
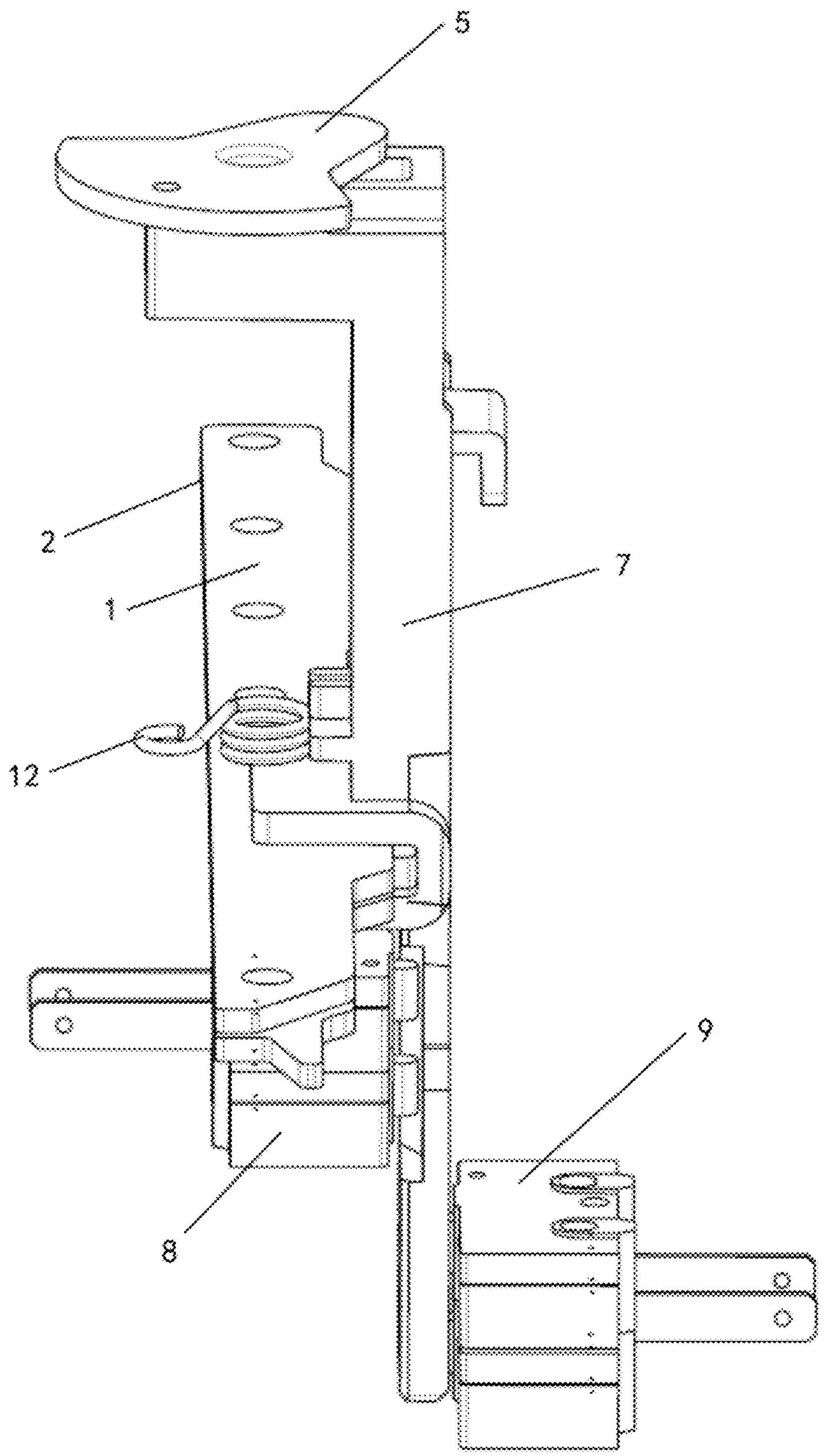
FIG. 3 shows a schematic diagram in which a first switching device and a second switching device according to the present disclosure are respectively placed on both sides of an indicating component and their double contacts are connected in parallel inside the switch.

According to the above-described embodiments of the present disclosure, as shown in FIGS. 2 and 3, the first switching device 8 and the second switching device 9 are respectively disposed on both sides of the indicating part 7.

Figure 4:
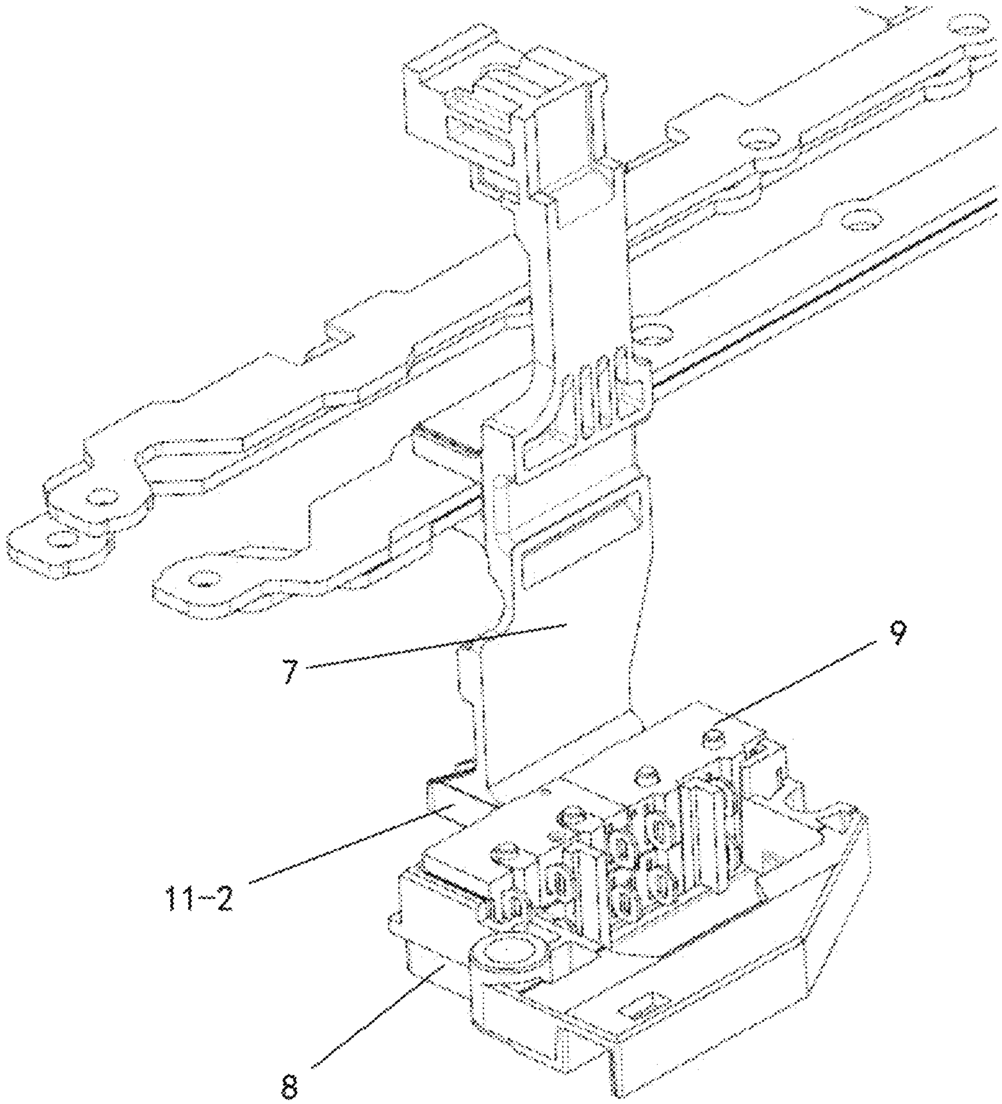
FIG. 4 shows a schematic diagram in which a first switching device and a second switching device according to the present disclosure are placed on the same side of an indicating member.

According to the above-described embodiments of the present disclosure, as shown in FIG. 4, the first switching device 8 and the second switching device 9 are disposed on the same side of the indicating part 7 and arranged side by side.

According to the above embodiments of the present disclosure, the movement of the indicating part 7 drives the mechanical indicating device 5 to move to the position indicating that the first power supply is switched on (as shown in FIGS. 1 to 3 and 5), the position indicating that the second power supply is switched on, and the position indicating that the first power supply and the second power supply are both switched off.

The movement of the indicating part 7 correspondingly actuates the electrical indicating device 6 to indicate the switching-on signal of the first power supply, the switching-on signal of the second power supply and the switching-off signal of the first power supply and the second power supply.

Figure 8:
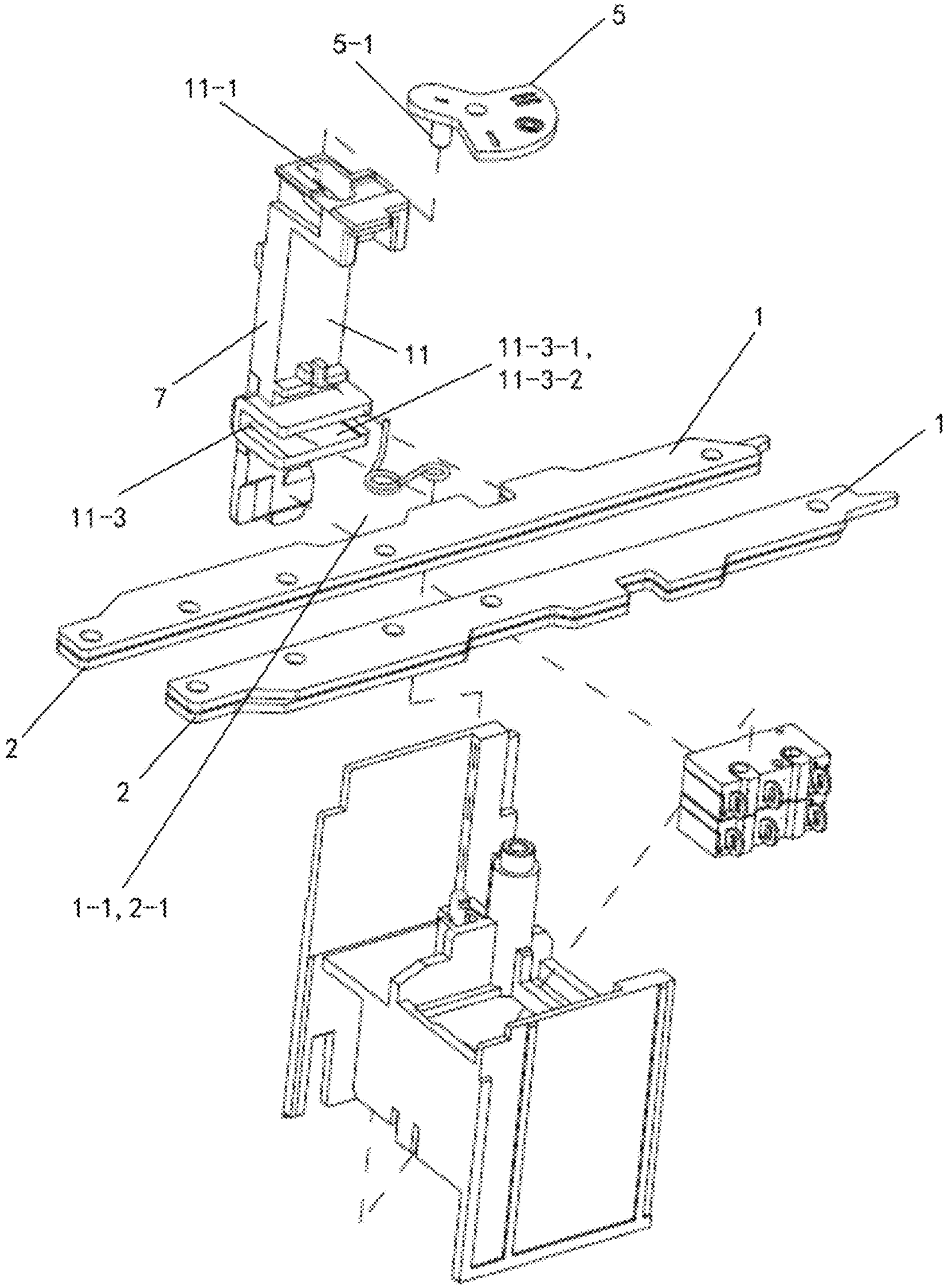
FIG. 8 shows an exploded perspective view of FIG. 1.

According to the above-described embodiments of the present disclosure, as shown in FIG. 8, the indicating part 7 is an indicating rod 11.

The first end of the indicating rod 11 is provided with an indicating rod groove 11-1.

A mechanical swing rod 5-1 arranged on the mechanical indicating device 5 can slide in the indicating rod groove 11-1.

With the movement of the indicating rod 11, the indicating rod groove 11-1 actuates the mechanical swing rod 5-1, so that the mechanical indicating device 5 rotates around a rotation center (not shown) provided on the housing of the dual-power automatic transfer switch to a position indicating that the first power supply is switched on (as shown in FIG. 1), a position indicating that the second power supply is switched on, and a position indicating that the first power supply and the second power supply are both switched off.

Figure 5:
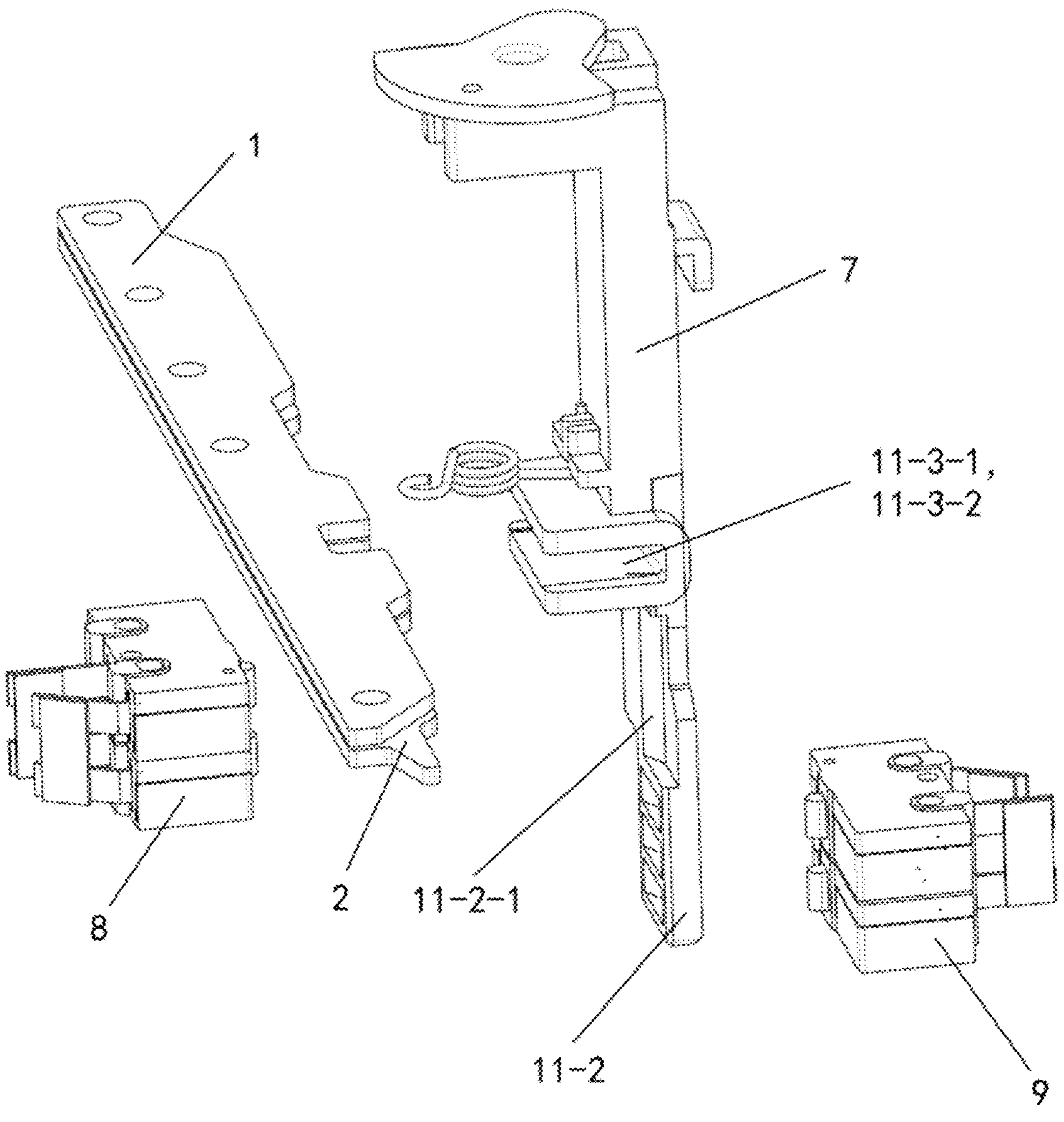
FIG. 5 shows an exploded perspective view of FIG. 2.

According to the above-described embodiments of the present disclosure, as shown in FIG. 5, an indicating rod pressing plate 11-2 is provided on the second end of the indicating rod 11.

The indicating rod pressing plate 11-2 comprises a pressing plate slot 11-2-1.

When the indicating rod pressing plate 11-2 presses the first contact 8-1 and the second contact 8-2 of the first switching device 8 and the first contact 9-1 and the second contact 9-2 of the second switching device 9 at the same time, the first switching device 8 and the second switching device 9 both provide switching-off signals.

When the indicating rod pressing plate 11-2 simultaneously presses the first contact 8-1 and the second contact 8-2 of the first switching device, and the first contact 9-1 and the second contact 9-2 of the second switching device are in the pressing plate slot 11-2-1, the first switching device 8 provides a switching-off signals of the first power supply, and the second switching device 9 provides a switching-on signals of the second power supply.

When the indicating rod pressing plate 11-2 presses the first contact 9-1 and the second contact 9-2 of the second switching device 9 at the same time, and the first contact 8-1 and the second contact 8-2 of the first switching device 8 are in the pressing plate slot 11-2-1 (as shown in FIG. 5), the second switching device 9 provides the switching-on signals of the second power supply, and the first switching device 8 provides the switching-off signals of the first power supply.

According to the above-described embodiments of the present disclosure, an indicating rod fitting part 11-3 is provided between the first end and the second end of the indicating rod 11.

The indicating rod fitting part 11-3 comprises an indicating rod first engaging portion 11-3-1 and an indicating rod second engaging portion 11-3-2.

The first engaging portion 11-3-1 of the indicating rod 11 is matched with the first driving part 1, and the movement of the first driving part 1 actuates the first engaging portion 11-3-1 to drive the indicating rod 11 to move.

The second engaging portion 11-3-2 of the indicating rod 11 is matched with the second driving part 2, and the movement of the second driving part 2 actuates the second engaging portion 11-3-2 to drive the indicating rod 11 to move.

According to the above-mentioned embodiments of the present disclosure, the first engaging portion 11-3-1 of the indicating rod is a first protrusion, which is matched with the first groove 1-1 provided in the first driving part 1, and the movement of the first groove 1-1 actuates the first protrusion to drive the indicating rod 11 to move.

The second engaging portion 11-3-2 of the indicating rod is a second protrusion, which is matched with a second groove 2-1 provided on the second driving part 2, and the movement of the second groove 2-1 actuates the second protrusion to drive the indicating rod 11 to move.

According to the above-described embodiments of the present disclosure, the indicating device further comprises a reset spring 12.

One end of the reset spring 12 is mounted on a housing (not shown) of the dual-power automatic transfer switch.

The other end of the reset spring 12 acts on the indicating rod 11, and the reset spring 12 exerts its elastic force on the indicating rod 11 in the direction of switching on the first power supply.

The function of the reset spring 12 is that when the moving contact of the first power supply is switched on, the first driving part 1 connected to the moving contact of the first power supply directly drives the indicating rod 11 to move to the right to switch on, but the indicating rod 11 does not move to the rightmost end due to the switching-on operation is not in place, and the electric indicating device may not be completely released (the indicating rod pressing plate 11-2 still partially presses the first switching device 8, and the indicating rod pressing plate 11-2 completely presses the second switch), so as to still indicate the switching-off signal of the first power supply (the mechanical indication 5 also does not move to the position indicating the switching on of the first power supply). At this time, due to the existence of the reset spring 12, the indicating rod 11 returns to the first power supply fully closed position (the indicating rod pressing plate 11-2 will not press the first switching device 8, that is, the first switching device 8 is completely in the pressing plate slot 11-2-1, and the first switching device 8 provides the switching-on signal of the first power supply, while the mechanical indicator 5 moves to the position indicating the first power supply is switched on).

According to the above embodiments of the present disclosure, the indicating rod fitting portion 11-3 is a U-shaped groove.

The first driving part 1 and the second driving part 2 are respectively matched with the first protrusion and the second protrusion in the U-shaped groove.

According to the above embodiments of the present disclosure, the first switching device 8 and the seconding switching device 9 are micro switches.

According to the above-mentioned embodiments of the present disclosure, one end of the first driving part 1 and the second driving part 2 is connected with the moving contacts corresponding to the first power supply and the second power supply 2, and the other end is connected with a driving mechanism. When the driving mechanism operates, the first driving part 1 and the second driving part 2 move in translation to drive the position of the moving contact to switch on or switch off. As shown in the figure, the indicating rod 11 is clamped on the first driving part 1 and the second driving part 2 to move in translation with each driving part. The indicating rod 11 drives the mechanical indicator to rotate or move to display the contact position, and at the same time, the indicating rod 11 triggers the first switching device 8 and the second switching device 9 as micro switches to indicate the switching on/off signal.

In FIGS. 1 and 2, the first moving contact 3 corresponding to the first power supply is in the switching on position, while the second moving contact 4 corresponding to the second power supply is in the switching off position. At this time, the mechanical indicating device 5 is in the position of indicating the first power supply to be switched on, while the first switching device 8 of the electrical indicating device 6 is not pressed by the indicating rod pressing plate 11-2 so as to be in the pressing plate slot 11-2-1, the second switching device 9 is pressed by the indicating rod pressing plate 11-2, and the first switching device 8 provides the switching-on signal of the first power supply and the second switching device 9 provides the switching-off signal of the second power supply.

When the first moving contact 3 corresponding to the first power supply starts to move toward the switching off position, the movement of the first moving contact 3 drives the first driving part 1 to move, and then the movement of the first groove 1-1 actuates the first protrusion to drive the indicating rod 11 to move. With the movement of the indicating rod 11, the indicating rod groove 11-1 actuates the mechanical swing rod 5-1, so that the mechanical indicating device 5 rotates around a rotation center provided on the housing of the dual-power automatic transfer switch to a position indicating that the first power supply and the second power supply are all switched off. At the same time, both the first switching device 8 and the second switching device 9 of the electrical indicating device 6 are pressed by the indicating rod pressing plate 11-2. The first switching device 8 provides the switching off signal of the first power supply and the second switching device 9 provides the switching off signal of the second power supply.

When the second moving contact 4 corresponding to the second power supply starts to move towards the switching on position, the second moving contact 4 drives the second driving part 2 to move, and then the movement of the second groove 2-1 actuates the second protrusion to drive the indicating rod 11 to move. With the movement of the indicating rod 11, the indicating rod groove 11-1 actuates the mechanical swing rod 5-1, so that the mechanical indicating device 5 rotates around the rotation center provided on the housing of the dual-power automatic transfer switch to the position indicating the second power supply is switched on. At the same time, the first switching device 8 of the electrical indicator device 6 is pressed by the indicating rod pressing plate 11-2, while the second switching device 9 is not pressed by the indicating rod pressing plate 11-2. The first switching device 8 provides the switching off signal of the first power supply, and the second switching device 9 provides the switching on signal of the second power supply.

As there are two groups of contacts connected in parallel (internal or external parallel connection) at each corresponding position of S1/S2 (the first/second S1/S2 power supply), when two contact buttons connected in parallel at the same position are triggered by the indicating rod 11 at the same time, as long as one of them is turned on, the whole circuit is turned on. On the contrary, if the indicating rod 11 releases the contact buttons, both contact buttons must be released at the same time to correctly indicate the position. In view of the fact that the commonly used micro switches as contacts often come out to trigger non-conduction, this scheme makes the simultaneous failure of two micro switches become a small probability event, which greatly reduces the failure probability, thus greatly improving the reliability of the position indication of the electrical indicating device.

With reference to the specific embodiments, although the utility model has been explained in the specification and drawings, it should be understood that without departing from the scope of the utility model defined in the claims, those skilled in the technical field can make various changes and various equivalents can replace various elements. Moreover, the combination and collocation of technical features, elements and/or functions among the specific embodiments herein are clear, so according to these disclosures, those skilled in the art can realize that the technical features, elements and/or functions in one embodiment can be combined into another specific embodiment as appropriate, unless otherwise described in the above. In addition, according to the teaching of the utility model, many changes can be made to adapt to special situations or materials without departing from the essential scope of the utility model. Therefore, the utility model is not limited to the individual specific embodiments illustrated in the drawings, and the specific embodiments described in the specification as the best embodiments envisaged for the implementation of the utility model at present, but the utility model is intended to include all the embodiments that fall within the scope of the above specification and appended claims.

What is claimed is:

1. An indicating device for a dual power automatic transfer switch comprising a first driving part connected to a first moving contact of a first power supply and a second driving part connected to a second moving contact of a second power supply;

the indicating device comprises a mechanical indicating device, an electrical indicating device and an indicating part acting on the mechanical indicating device and the electrical indicating device;

the first driving part and the second driving part respectively drive the indicating part to move;

wherein, the electric indicating device at least comprises a first switching device and a second switching device;

the first switching device at least comprises a first contact of the first switching device and a second contact of the first switching device which are connected in parallel;

the second switching device at least comprises a first contact of the second switching device and a second contact of the second switching device which are connected in parallel.

2. The indicating device for the dual power automatic transfer switch according to claim 1, wherein, a lead pin of the first contact of the first switching device and a lead pin of the second contact of the first switching device are connected in parallel outside the first switching device;

a lead pin of the first contact of the second switching device and a lead pin of the second contact of the second switching device are connected in parallel outside the second switching device.

3. The indicating device for the dual power automatic transfer switch according to claim 2, wherein, the lead pin of the first contact of the first switching device and the lead pin of the second contact of the first switching device are connected in parallel inside the first switching device;

the first contact of the first switching device and the second contact of the first switching device have a common lead pin outside the first switching device;

the lead pin of the first contact of the second switching device and the lead pin of the second contact of the second switching device are connected in parallel inside the second switching device;

the first contact of the second switching device and the second contact of the second switching device have a common lead pin outside the second switching device.

4. The indicating device for the dual power automatic transfer switch according to claim 2, wherein, the first switching device and the second switching device are respectively arranged on different sides of the indicating part.

5. The indicating device for dual power automatic transfer switch according to claim 2, wherein, the first switching device and the second switching device are arranged on a same side of the indicating part.

6. The indicating device for dual power automatic transfer switch according to claim 2, wherein, movement of the indicating part drives the mechanical indicating device to move to a position indicating the first power supply to switch on, a position indicating the second power supply to switch on and a position indicating that the first power supply and the second power supply are all switched off;

the movement of the indicating part correspondingly actuates the electrical indicating device to indicate a switching-on signal of the first power supply, a switching-on signal of the second power supply and a switching-off signal of the first power supply and the second power supply.

7. The indicating device for dual power automatic transfer switch according to claim 6, wherein, the indicating part is an indicating rod;

a first end of the indicating rod is provided with an indicating rod groove;

a mechanical swing rod arranged on the mechanical indicating device can slide in the indicating rod groove;

with the movement of the indicating rod, the indicating rod groove actuates the mechanical swing rod, so that the mechanical indicating device rotates around a rotation center arranged on a housing of the dual-power automatic transfer switch to the position indicating the first power supply is switched on, the second power supply is switched on and the first power supply and the second power supply are all switched off.

8. The indicating device for the dual power automatic transfer switch according to claim 7, wherein, the second end of the indicating rod is provided with an indicating rod pressing plate;

the indicating rod pressing plate comprises a pressing plate slot;

when the indicating rod pressing plate simultaneously presses the first contact of the first switching device and the second contact of the first switching device and the first contact of the second switching device and the second contact of the second switching device, the first switching device and the second switching device both provide switching off signals;

when the indicating rod pressing plate simultaneously presses the first contact of the first switching device and the second contact of the first switching device, and the first contact of the second switching device and the second contact of the second switching device are in the pressing plate slot, the first switching device provides the switching off signal of the first power supply, and the second switching device provides the switching on signal of the second power supply;

when the indicating rod pressing plate presses the first contact of the second switching device and the second contact of the second switching device, and the first contact of the first switching device and the second contact of the first switching device are in the pressing plate slot, the second switching device provides the switching off signal of the second power supply, and the first switching device provides the switching on signal of the first power supply.

9. The indicating device for the dual power automatic transfer switch according to claim 8, wherein, an indicating rod fitting part is arranged between the first end and the second end of the indicating rod;

the indicating rod fitting part comprises an indicating rod first engaging part and an indicating rod second engaging part;

the indicating rod first engaging part is matched with the first driving part, and the movement of the first driving part actuates the first engaging part to drive the indicating rod to move;

the indicating rod second engaging part is matched with the second driving part, and the movement of the second driving part actuates the second engaging part to drive the indicating rod to move.

10. The indicating device for the dual power automatic transfer switch according to claim 9, wherein, the indicating rod first engaging part is a first protrusion which is match with a first groove arranged on the first driving part, and the movement of the first groove actuates the first protrusion to drive the indicating rod to move;

the indicating rod second engaging part is a second protrusion which is match with a second groove arranged on the second driving part, and the movement of the second groove actuates the second protrusion to drive the indicating rod to move.

11. The indicating device for the dual power automatic transfer switch according to claim 10, wherein, the indicating device also comprises a reset spring;

one end of the reset spring is installed on the housing of the dual-power automatic transfer switch;

the other end of the reset spring acts on the indicating rod, and the reset spring exerts its elastic force on the indicating rod in the direction of switching on the first power supply.

12. The indicating device for the dual power automatic transfer switch according to claim 11, wherein, the indicating rod fitting part is a U-shape groove;

the first driving part and the second driving part are respectively matched with the first protrusion and the second protrusion in the U-shaped groove.

13. The indicating device for the dual power automatic transfer switch according to claim 1, wherein, the first switching device and the second switching device are micro switches.

* * * * *